(12) United States Patent
Chang

(10) Patent No.: US 8,807,525 B2
(45) Date of Patent: Aug. 19, 2014

(54) QUICK-RELEASE COUPLING

(75) Inventor: Chia-Chun Chang, Lungshou Village (TW)

(73) Assignee: Sun-Wounder Industrial Co., Ltd, Taoyuan (TW)

( * ) Notice: Subject to any disclaimer, the term of this patent is extended or adjusted under 35 U.S.C. 154(b) by 11 days.

(21) Appl. No.: 13/463,784

(22) Filed: May 3, 2012

(65) Prior Publication Data
US 2013/0292591 A1 Nov. 7, 2013

(51) Int. Cl.
*F16L 37/28* (2006.01)

(52) U.S. Cl.
USPC .................. 251/149.6; 251/149.9; 251/148; 137/614.05; 137/614.06

(58) Field of Classification Search
CPC .................................. F16L 37/36; F16L 37/23
USPC ........ 137/614, 614.05, 614.06; 251/145, 148, 251/149.6, 149.8, 148.9, 264
See application file for complete search history.

(56) References Cited

U.S. PATENT DOCUMENTS

| | | | |
|---|---|---|---|
| 5,139,049 A * | 8/1992 | Jensen et al. | 137/614.05 |
| 5,339,862 A * | 8/1994 | Haunhorst | 137/614.05 |
| 5,415,200 A * | 5/1995 | Haunhorst et al. | 137/614.05 |
| 5,603,353 A * | 2/1997 | Clark et al. | 137/614.01 |
| 6,450,199 B1 * | 9/2002 | Haunhorst | 137/614.2 |
| 6,637,460 B2 * | 10/2003 | Haunhorst | 137/614.06 |
| 7,237,760 B1 * | 7/2007 | Chiu | 251/264 |

* cited by examiner

Primary Examiner — John K Fristoe, Jr.
Assistant Examiner — Angelisa Hicks

(57) ABSTRACT

A quick-release coupling includes a socket defining a first passage in a connection port thereof, a locking member mounted in a front end of the socket and adapted for locking an inserted external male mating connector, an air valve control device mounted in a rear end of the socket, and a leak-proof device having a stopper mounted in the front end of the socket and defining therein a second passage, which is kept in communication with the first passage upon insertion of an external mating male connector into the front end of the socket to move the stopper backward, or blocked from the first passage after removable of the inserted external mating male connector and a forward movement of the stopper by the air valve control device.

4 Claims, 6 Drawing Sheets

QUICK-RELEASE COUPLING

BACKGROUND OF THE INVENTION

1. Field of the Invention

The present invention relates to coupling devices and more particularly, to a quick-release coupling for refrigerant cycle system, which prevents refrigerant leak.

2. Description of the Related Art

When removing a mating male connector from a quick-release coupling of a refrigerant cycle system, a pressure-discharge process is simultaneously performed. Thus, a residual gas will be ejected out of the mating male connector and the quick-release coupling upon removal of the mating connector from the quick-release coupling. A quick-release coupling for use in a refrigerant cycle system is adapted for the extraction of refrigerant. According to conventional designs, when connecting the mating male connector to the quick-release coupling, the passage between the quick-release coupling/mating male connector and the refrigerant cycle system is blocked. When the user pushes the pusher pin of the quick-release coupling, the sealer of the mating male connector is opened, allowing fluid communication between the mating male connector, the quick-release coupling and the refrigerant cycle system. The passage is opened when the pusher pin of the quick-release coupling is operated to move the sealer of the mating male connector. After a refrigerant filling/cycling operation, the pusher pin is moved back, and the passage of the quick-release coupling and the passage of the mating male connector are blocked. At this time, the quick-release coupling and the mating male connector still have residual refrigerant left therein. The residual refrigerant will leak out of the quick-release coupling and the mating male connector after removal of the mating male connector from the quick-release coupling, causing environmental pollution and making harm to the user's health.

SUMMARY OF THE INVENTION

The present invention has been accomplished under the circumstances in view. It is one object of the present invention to provide a quick-release coupling, which provides a leak-proof device in the front end thereof that allows complete extraction of residual refrigerant before removal of the connected mating male connector, and automatically blocks the passage to prevent refrigerant leak and environmental pollution after removal of the connected mating male connector.

To achieve this and other objects of the present invention, a quick-release coupling comprises a socket that defines a first passage in a connection port thereof, a locking member mounted in the front end of the socket and adapted for locking an inserted external male mating connector, an air valve control device mounted in the rear end of the socket, and a leak-proof device, which comprises a stopper axially movably mounted inside the front end of the socket and defining opposing front push end and rear stop end and a second passage axially extending through the front push end and the rear stop end, and a spring member stopped between the stopper and a part of the air valve control device. The stopper is axially movable relative to the socket between a first position where the first passage is blocked from second passage and a second position where the first passage is kept in fluid communication with the second passage.

DETAILED DESCRIPTION OF THE PREFERRED EMBODIMENT

Figure 1:
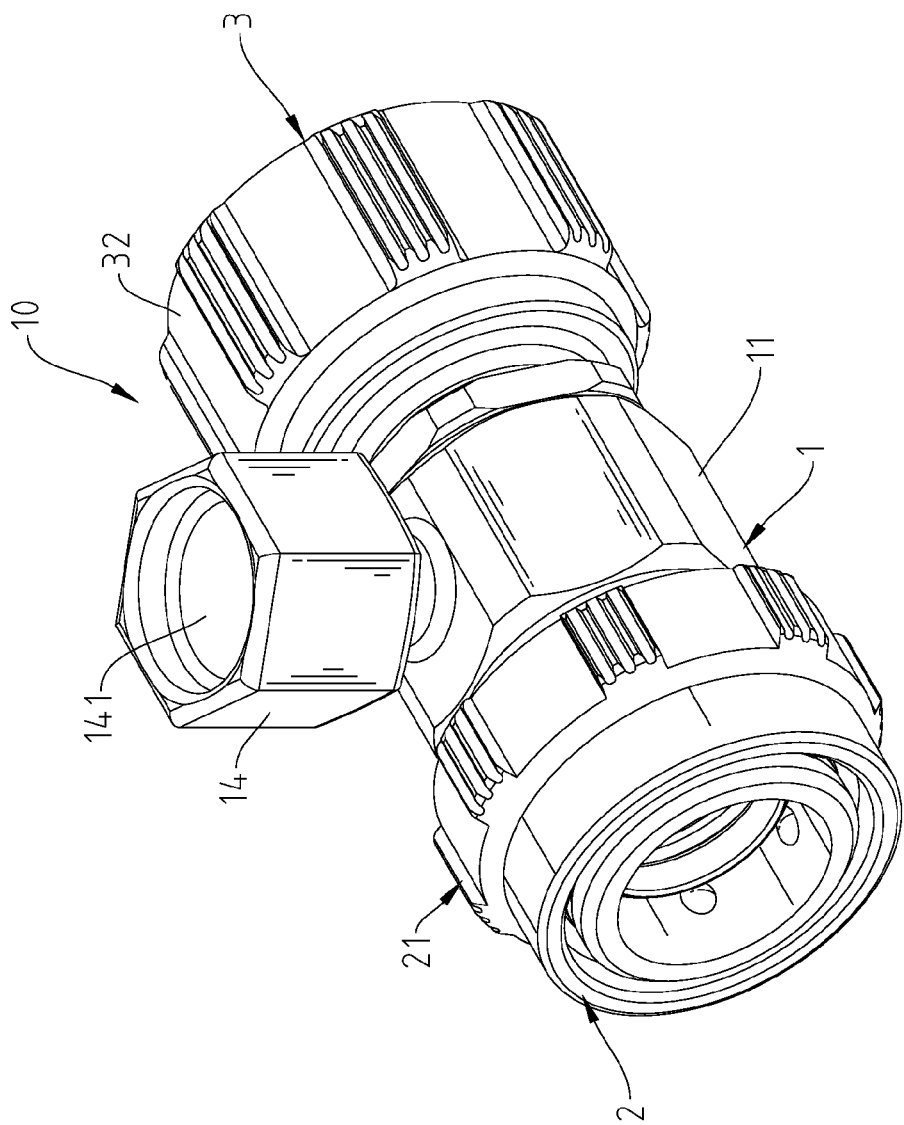
FIG. 1 is an elevational view of a quick-release coupling in accordance with the present invention.
Figure 2:
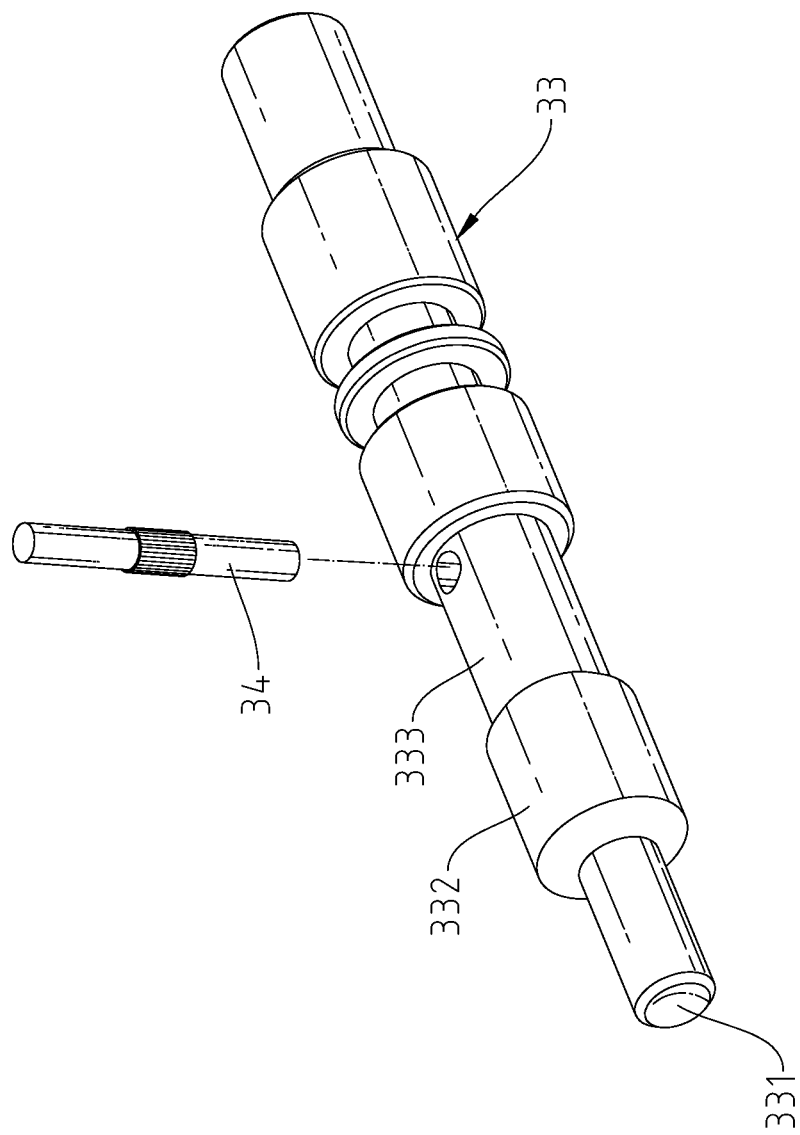
FIG. 2 is an elevational view of a part of the quick-release coupling in accordance with the present invention.

Referring to FIGS. 1-4, a quick-release coupling 10 in accordance with the present invention is shown comprising a socket 1, a locking member 2, an air valve control device 3, and a leak-proof device 4.

The socket 1 comprises a socket body 11 defining opposing front end 12 and rear end 13 in communication with each other, an inner thread 131 formed in the rear end 13 of the socket body 11, a connection port 14 connected to a refrigerant pump (not shown) and defining therein a first passage 141 in communication with the inside space of the socket body 11, and a plurality of radial holes 121 disposed around the periphery of the front end 12 of the socket body 11.

The locking member 2 comprises a sliding chuck 21, a first spring member 22, and a plurality of rolling balls 23. The rolling balls 23 are respectively rotatably mounted in the radial holes 121 of the socket 1. The sliding chuck 21 is mounted around the front end 12 of the socket body 11 of the socket 1, having an engagement portion 211 protruded from the inside wall thereof. The first spring member 22 is mounted on the front end 12 of the socket body 11 of the socket 1 and stopped between the engagement portion 211 and a part of the socket body 11 to impart a forward pressure to the engagement portion 211 against the rolling balls 23 in the radial holes 121 of the socket 1.

The air valve control device 3 comprises a plug 31, which comprises a first outer thread 311 extending around the front end thereof and threaded into the inner thread 131 of the socket body 11 of the socket 1 and a second outer thread 312 extending around the rear end thereof and disposed outside the socket 1, a grip 32, which comprises an inner thread 321 threaded onto the outer thread 312 of the plug 31, a pusher pin 33, which is axially movably inserted through the plug 31 into the inside of the socket body 11 of the socket 1 and affixed to the grip 32 by a fastening member 7 and which comprises a front tip 331, a neck 333 and a collar 332 connected between the front tip 331 and the neck 333, and a stop pin 34 transversely fastened to the pusher pin 33 near the rear end of the neck 333 and stoppable at the front side of the plug 31 inside the socket body 11 of the socket 1.

The leak-proof device 4 comprises a stopper 41 axially movably mounted inside the front end 12 of the socket body 11 of the socket 1 and defining opposing front push end 411 and rear stop end 412 and a second passage 413 axially extending through the front push end 411 and the rear stop end 412 for receiving the pusher pin 33, a second spring member 42 stopped between the stopper 41 and the plug 31, a first gasket ring 43 mounted around the front push end 411 of the stopper 41, and a second gasket ring 44 mounted in the rear stop end 412 of the stopper 41.

Figure 3:
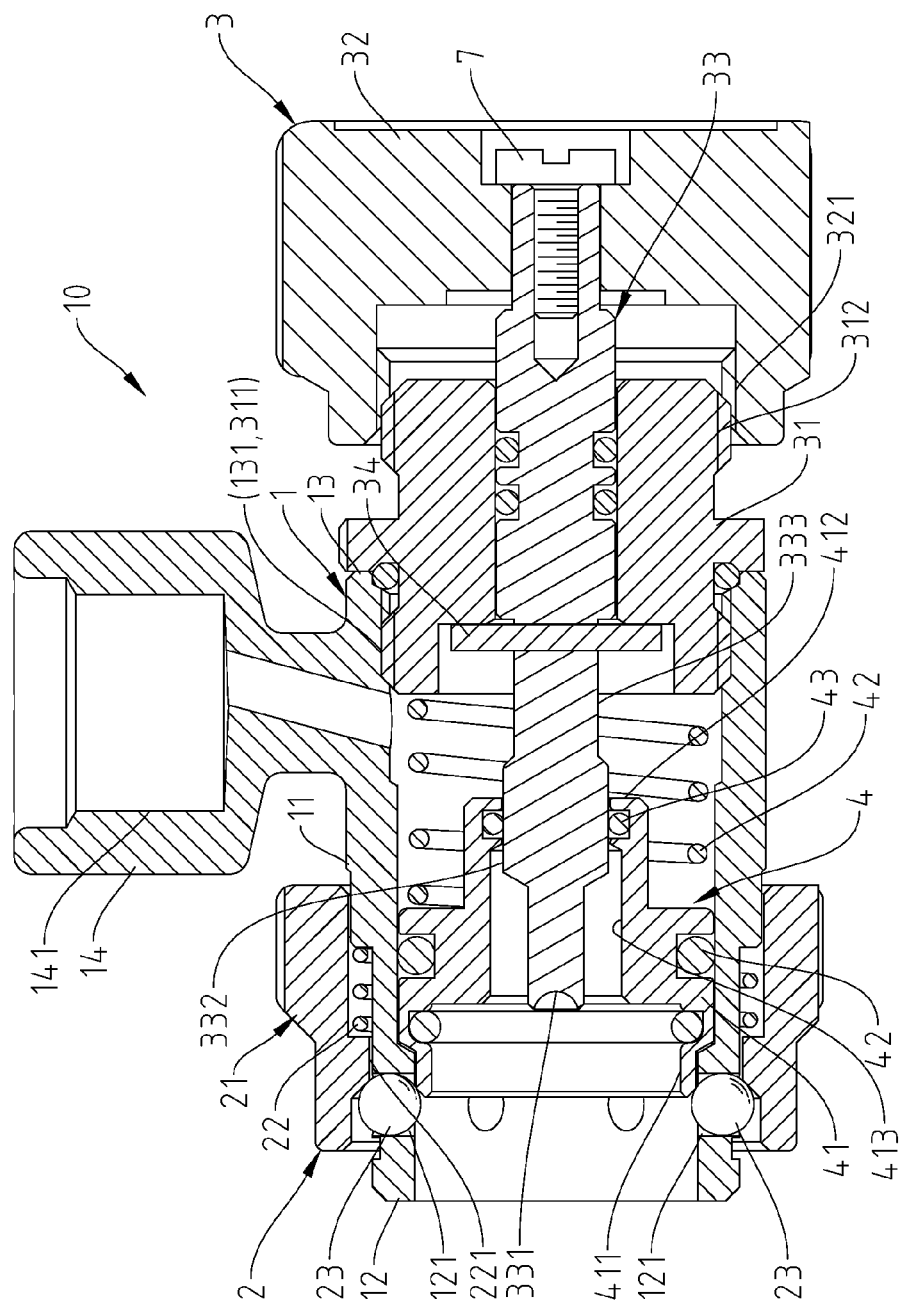
FIG. 3 is a sectional side view of the quick-release coupling in accordance with the present invention.
Figure 4:
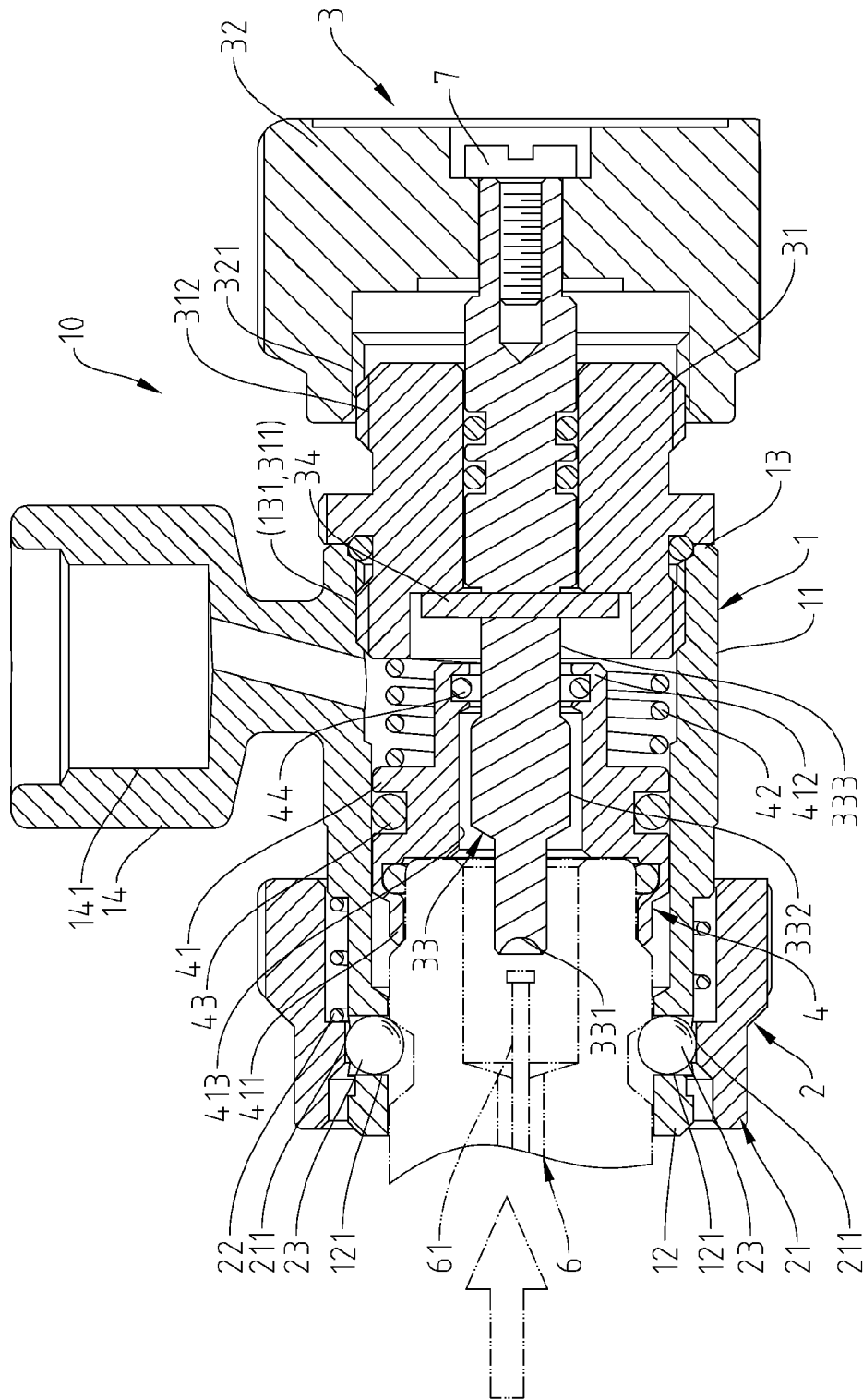
FIG. 4 is a schematic drawing illustrating an operation status of the quick-release coupling in accordance with the present invention (I).
Figure 5:
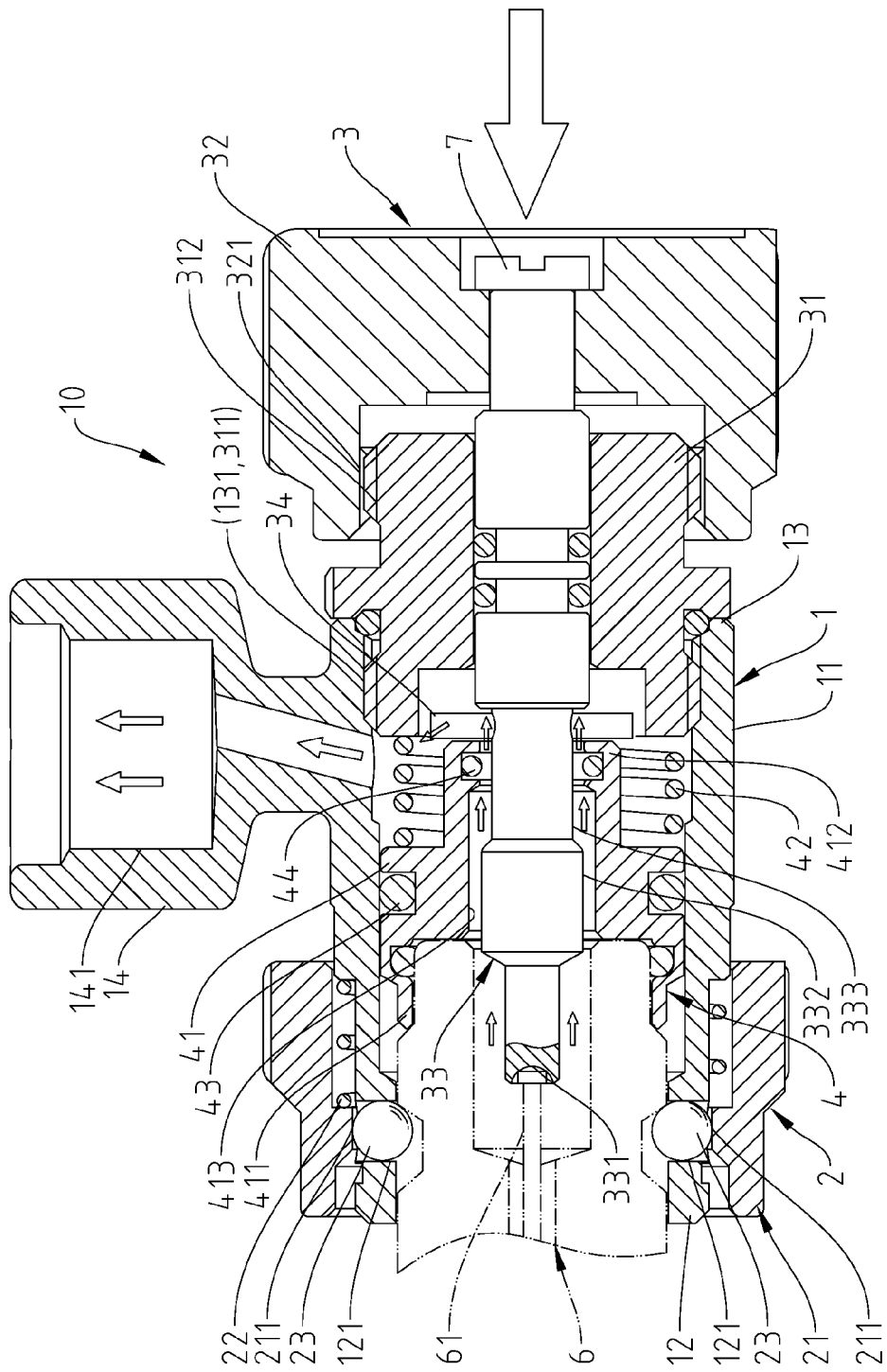
FIG. 5 is a schematic drawing illustrating an operation status of the quick-release coupling in accordance with the present invention (II).
Figure 6:
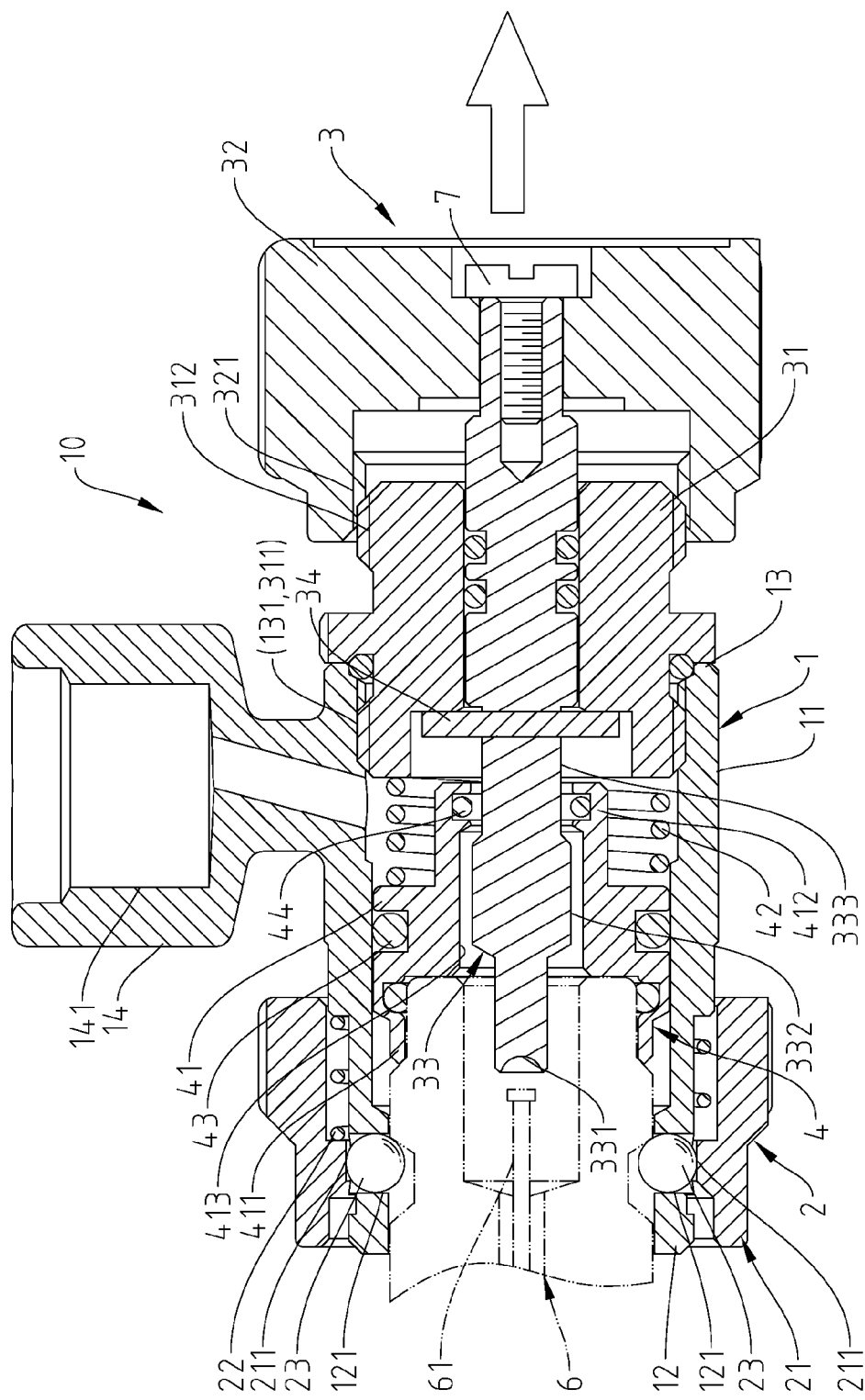
FIG. 6 is a schematic drawing illustrating an operation status of the quick-release coupling in accordance with the present invention (III).

Referring to FIGS. 3-6, before application of the quick-release coupling 10, as shown in FIG. 3, the stopper 41 of the leak-proof device 4 is forced by the second spring member 42 into engagement with the inside wall of the front end 12 of the socket body 11 of the socket 1. When using the quick-release coupling 10, rotate the grip 32 to move the pusher pin 33 in direction away from the socket body 11 of the socket 1 to the position where the stop pin 34 is stopped at the front side of the plug 31 inside the socket body 11 of the socket 1. At this time, the rear stop end 412 of the stopper 41 is kept in close contact with the collar 332 of the pusher pin 33 in an airtight status to block the first passage 141 from the second passage 413. Thereafter, insert a mating male connector 6 into the front end 12 of the socket body 11 of the socket 1, as shown in FIG. 4. After insertion of the mating male connector 6 into the front end 12 of the socket body 11 of the socket 1, the mating male connector 6 is firmly secured to the socket body 11 by the sliding chuck 21 and rolling balls 23 of the locking member 2 and the pusher pin 33 is kept away from an air valve pin 61 of the mating male connector 6. Further, inserting the mating male connector 6 into the front end 12 of the socket body 11 of the socket 1 will push the front push end 411 of the stopper 41, moving the stopper 41 toward the rear end 13 of the socket body 11 to the position where the rear stop end 412 of the stopper 41 is disposed corresponding to the neck 333 of the pusher pin 33 with a gap left therebetween to conducting the first passage 141 and the second passage 413. Referring to FIG. 5, after the mating male connector 6 is locked to the front end 12 of the socket body 11, rotate the grip 32 to move the pusher pin 33 in direction toward the socket body 11 of the socket 1, stopping the stop pin 34 against the rear stop end 412 of the stopper 41. At this time, the front tip 331 of the pusher pin 33 pushed the air valve pin 61 of the mating male connector 6, and the refrigerant pump is started to pump refrigerant into the second passage 413 and then the first passage 141 toward the outside of the connection port 14. Referring to FIG. 6, when going to remove the mating male connector 6 from the quick-release coupling 10, rotate the grip 32 to move the pusher pin 33 in direction away from the socket body 11 to the position where the stop pin 34 is stopped at the front side of the plug 31 inside the socket body 11 of the socket 1. At this time, the front tip 331 of the pusher pin 33 is kept away from the air valve pin 61 of the mating male connector 6, and the refrigerant is stopped from flowing out of the mating male connector 6, however, the first passage 141 is still kept in communication with the second passage 413, allowing the refrigerant pump to continuously pump residual refrigerant in the mating male connector 6 and the quick-release coupling 10 toward the outside of the connection port 14. Therefore, removal of the mating male connector 6 from the quick-release coupling 10 does not cause any refrigerant leak. As the quick-release coupling 10 and the mating male connector 6 are not in a high pressure status at this time, the mating male connector 6 can easily be removed from the quick-release coupling 10, preventing gushing refrigerant.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A quick-release coupling, comprising:
a socket comprising a socket body defining an opposing front end and rear end in communication with each other, a connection port defining therein a first passage in communication with an internal space of said socket body;
a locking member mounted around said front end of said socket body of said socket and configured to releasably engage with a mating connector;
an air valve control device comprising a plug mounted at the rear end of said socket body for fluidically sealing the rear end of the socket body, a grip coupled to said plug, and a pusher pin axially movably inserted through said plug within the internal space of said socket body and movable axially by said grip relative to said plug and said socket body, said pusher pin comprising a front tip disposed in the front end of said socket body, a neck disposed in said socket body adjacent to the rear end of said socket body and a collar connected between said front tip and said neck, the collar having a diameter greater than a diameter of the neck; and
a leak-proof device comprising a stopper axially movably mounted inside the front end of said socket body and having an opposing front push end and rear stop end and a second passage axially extending through said front push end and said rear stop end, at least a portion of said pusher pin received in said second passage, a second spring member disposed between said stopper and said plug, said stopper being axially movable relative to said socket body between a first position where said rear stop end is forced into direct sealing engagement with a periphery of said collar of said pusher pin to fluidly block said first passage from said second passage and a second position where said rear stop end is spaced around said neck and sealingly disengaged from said collar to fluidly connect said first passage and said second passage;
wherein said leak-proof device further comprises a first gasket ring mounted around said front push end of said stopper, and a second gasket ring mounted in said rear stop end of said stopper.

2. The quick-release coupling as claimed in claim 1, wherein said air valve control device further comprises a stop pin transversely fastened to said pusher pin adjacent to a rear end of said neck and stoppable at a front side of said plug inside said socket body.

3. A quick-release coupling, comprising:
a socket comprising a socket body defining an opposing front end and rear end in communication with each other, a connection port defining therein a first passage in communication with an internal space of said socket body;
a locking member mounted around said front end of said socket body of said socket and configured to releasably engage with a mating connector;
an air valve control device comprising a plug mounted at the rear end of said socket body for fluidically sealing the rear end of the socket body, a grip coupled to said plug, and a pusher pin axially movably inserted through said plug within the internal space of said socket body and movable axially by said grip relative to said plug and said socket body, said pusher pin comprising a front tip disposed in the front end of said socket body, a neck disposed in said socket body adjacent to the rear end of said socket body and a collar connected between said front tip and said neck, the collar having a diameter greater than a diameter of the neck; and
a leak-proof device comprising a stopper axially movably mounted inside the front end of said socket body and having an opposing front push end and rear stop end and a second passage axially extending through said front push end and said rear stop end, at least a portion of said pusher pin received in said second passage, a second spring member disposed between said stopper and said plug, said stopper being axially movable relative to said socket body between a first position where said rear stop end is forced into direct sealing engagement with a periphery of said collar of said pusher pin to fluidly block said first passage from said second passage and a second position where said rear stop end is spaced around said neck and sealingly disengaged from said collar to fluidly connect said first passage and said second passage;

wherein said plug of said air valve control device comprises a first outer thread extending around a front end thereof and a second outer thread extending around a rear end thereof and disposed outside said socket; said socket body of said socket comprises an inner thread threaded onto said first outer thread of said plug; and said grip comprises an inner thread threaded onto said second outer thread of said plug.

4. The quick-release coupling as claimed in claim 3, wherein said air valve control device further comprises a stop pin transversely fastened to said pusher pin adjacent to a rear end of said neck and stoppable at a front side of said plug inside said socket body.

\* \* \* \* \*